United States Patent [19]
Chen

[11] Patent Number: 6,009,207
[45] Date of Patent: Dec. 28, 1999

[54] METHOD FOR SPEEDING UP JPEG QUANTIZATION OPERATIONS IN IMAGE COMPRESSION

[75] Inventor: Shih-Chieh Chen, HsinChuang, Taiwan

[73] Assignee: Holtek Semiconductor Inc., Hsinchu, Taiwan

[21] Appl. No.: 08/972,811

[22] Filed: Nov. 18, 1997

[30] Foreign Application Priority Data

May 6, 1997 [TW] Taiwan ................................. 86105982

[51] Int. Cl.[6] ....................................................... G06K 9/36
[52] U.S. Cl. ........................................... 382/251; 382/250
[58] Field of Search ..................................... 382/232, 248, 382/250, 251; 358/539, 261.1, 261.2, 261.3, 427, 432, 433; 348/27, 387, 405, 395; 364/715.02, 715.07; 341/50, 56, 59, 65, 67, 97, 107

[56] References Cited

PUBLICATIONS

Pennebaker and Mitchell, "JPEG still image data compression standard", Van Nostrand Reihold, N.-Y., pp. 344,345, and 381–386, 1993.

*Primary Examiner*—Phuoc Tran
*Attorney, Agent, or Firm*—W. Wayne Liauh

[57] ABSTRACT

A method for speeding up JPEG quantization operations in image compression for discrete cosine transform encoding operations in JPEG image compression. The quantization calculations are performed to obtain descriptors for Huffman encoding. The quantization calculations utilize a modified quantization table which is derived from an original quantization table by inversing each element of the original quantization table and then mutiplying $2^n$ and then rounding off. The matrix composed by discrete cosine transform coefficients multiplies the modified quantization table to derive a new matrix. Then, each element of the new matrix is right shifted n bits to derive quantized discrete cosine transform coefficients. Then, Huffman encoding is performed to accomplish discrete cosine transform encoding.

3 Claims, 4 Drawing Sheets

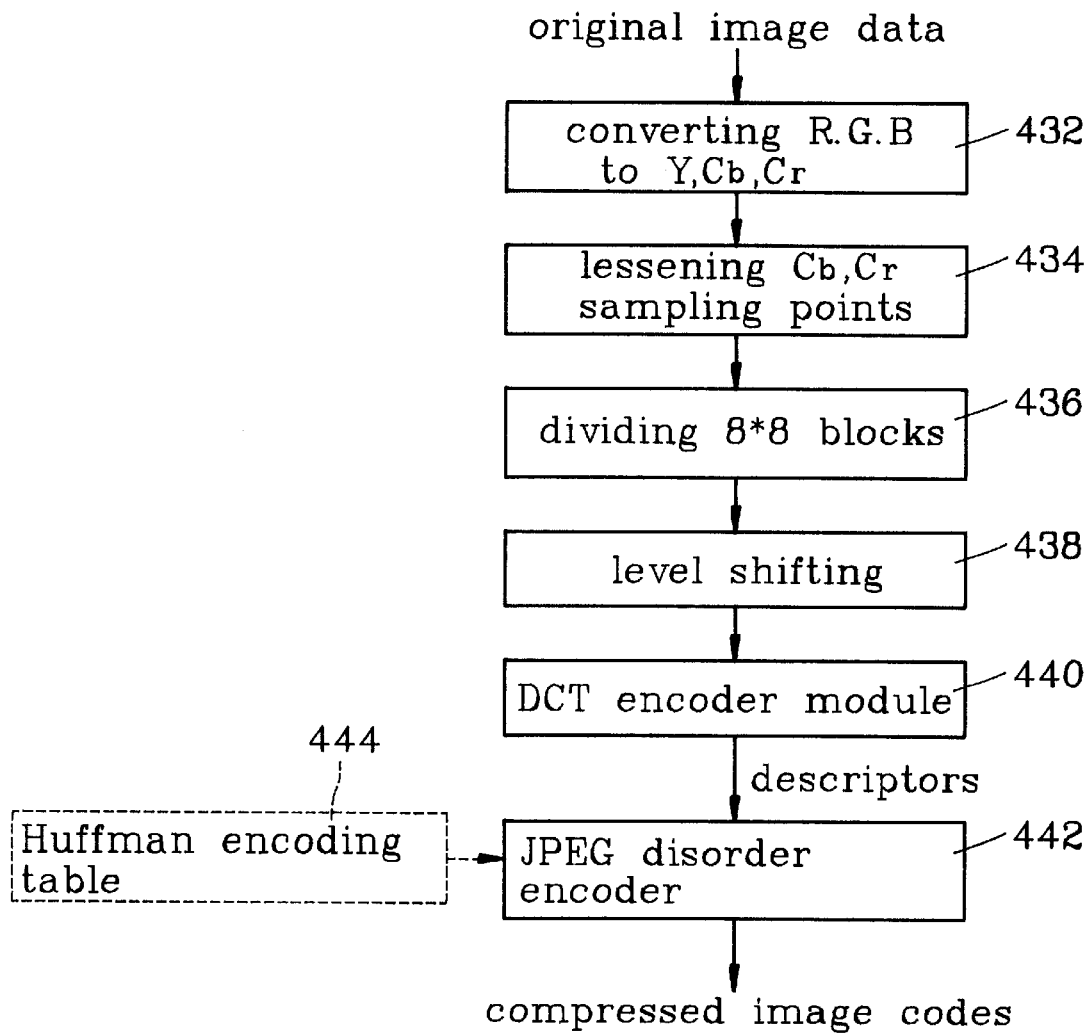
F I G.1

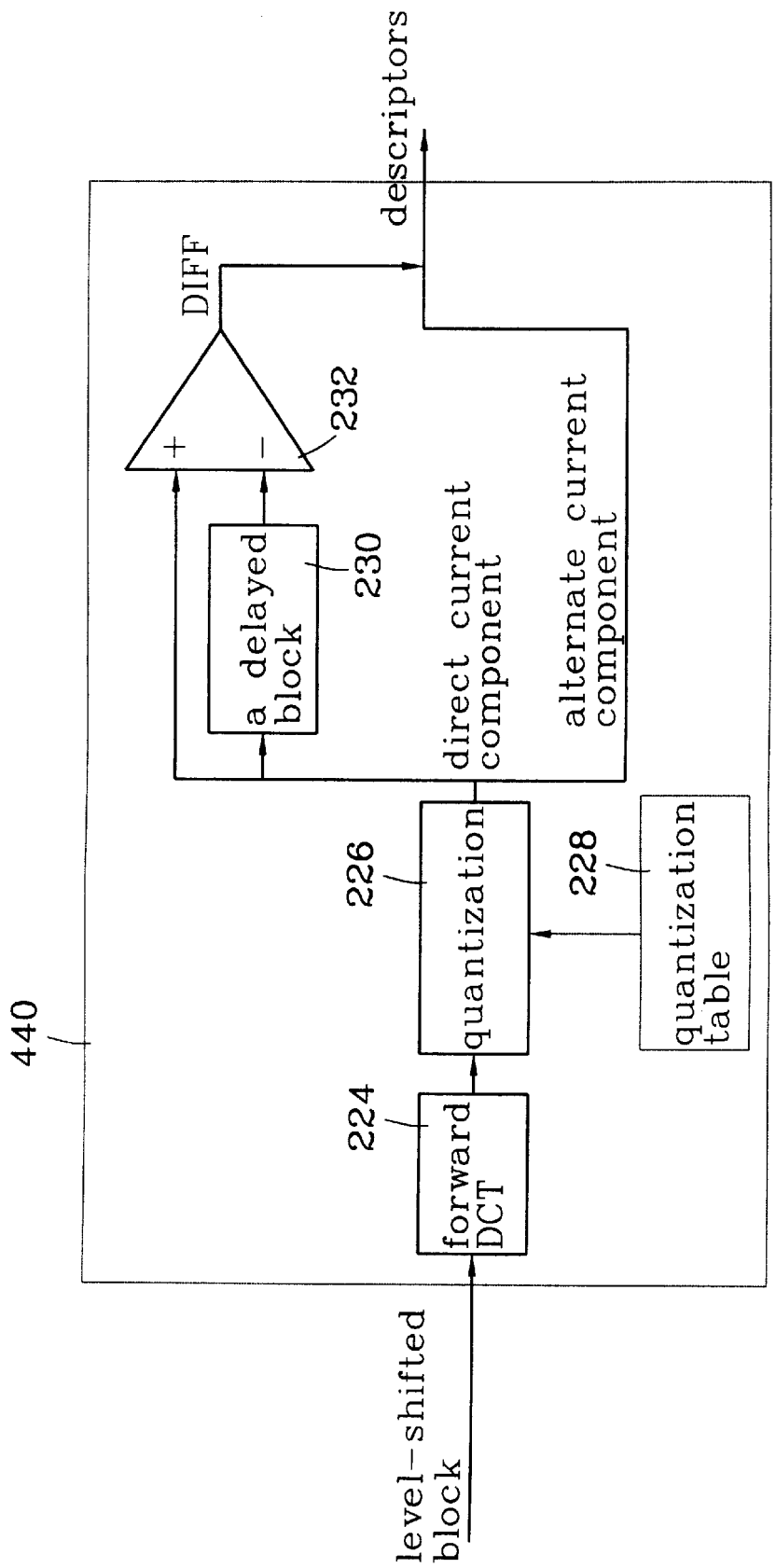
F I G. 2

METHOD FOR SPEEDING UP JPEG QUANTIZATION OPERATIONS IN IMAGE COMPRESSION

BACKGROUND OF THE INVENTION

1. Field of the Invention

The present invention relates generally to a method for speeding up JPEG quantization operations in image compression, and in particular to an improvement on the quantization table for reducing the time for quantization operations.

2. Description of the Prior Art

JPEG is an abbreviation form of the organization named Joint Photographic Experts Group. The purpose of this organization is to develop a compression standard for multicolour/black-and-white images from the natural scenery and true world. The compression standard developed is named after this organization, JPEG.

The greatest bottleneck for JPEG compression operations is the mass division operations during quantization. The division operations consume lots of time. Therefore, the application fields for JPEG are quite limited. In traditional applications, for abbreviating operation time, a highly-priced high speed operation processor is necessary. Alternatively, extra hardware circuits are necessary to maintain image quality. And, either way will cause an increase in cost. Therefore, a new algorithm is necessary to replace division operations so that the operation time can be reduced.

JPEG discloses several compression modes for static image. The most commonly utilized is the baseline mode wherein an encoder is utilized to perform some steps to accomplish compression. Referring to FIG. 1, the flow chart of a compression algorithm for baseline mode is illustrated.

Through image conversion 432, three primary colours, red R, green G and blue B are linearly converted to a luminance component Y and two chrominance components $C_b$ and $C_r$ by matrix operations. Y represents the grayscale component for original image and $C_b$ and $C_r$ comprise the colour components for converting grayscale images to multicolour images.

The sampling points is then lessened 434. For speeding up the succeeding compression operations, several $C_b$ and $C_r$ sampling points are then fetched to derive an average value. The average value is then utilized to replace the foregoing several sampling points. Therefore the size for $C_b$ and $C_r$ is reduced since that the human eyes are more sensitive to luminance than chrominance.

The block dividing 436 is then performed. The three components Y, $C_b$ and $C_r$ are all divided to blocks each composed by sixty-four (derived by eight multiplying eight) sampling points since that compression processing is performed by block.

The values in each block are of an unsigned number form. It is necessary to convert the unsigned number form to a signed number form. Such an operation is called level shift 438.

Then, through the operations and processing of a discrete cosine transform encoder module 440, a descriptor can be derived for each sampling point in a block. The description for such an operation will be detailedly described referring to FIG. 2 below.

Then, data is input to JPEG disorder encoder 442. The descriptors derived are utilized to generate a set of codes through Huffman encoding table 444. This set of codes are followed by the discrete cosine transform coefficients derived from quantized sampling points to accomplish encoding. After encoding each block, the front is affixed with a header and the end is affixed with a trailer. Therefore, the whole compression procedure is thus performed.

Referring to FIG. 2, a flow chart for a discrete cosine transform encoder module is illustrated. The flow chart illustrates that a level shifted block is converted to a descriptor through the module.

The level shifted block is then input to a discrete cosine transform encoder module 440. The discrete cosine transform coefficient $S_{vu}$ is derived through forward discrete cosine transform 224 first. The conversion formula for the forward discrete cosine transform 224 is $$S_{vu} = \frac{1}{4} C_u C_v \sum_{x=0}^{7} \sum_{y=0}^{7} S_{yx} \cos\frac{(2x+1)u\pi}{16} \cos\frac{(2y+1)v\pi}{16}$$

wherein $S_{yx}$ is a sampling point in a block, x=0~7, y=0~7, and, $S_{vu}$ is a sampling point derived in a discrete cosine transformed block, v=0~7, u=0~7, $$C_u, C_v = 1/\sqrt{2}, \quad u,v = 0$$
$$C_u, C_v = 1, \quad u,v \neq 0$$

After quantization processing 226, the discrete cosine transform coefficient quantized is derived. The quantized discrete cosine transform coefficient is divided to a direct current DC component and alternate current AC components. The difference between the direct current component of this block and the direct current component of the precedent block, DIFF, is the corresponding descriptor of the direct current component. The substractor 232 is utilized to perform the subtraction for obtaining the difference DIFF. The upperleft part of each block is a DC component, and the other sixty-three values are AC components Referrring to FIG. 3, a well-known quantization method is illustrated. The matrix composed by discrete cosine transform coefficients is divided by the original quantization table. And, the matrix composed by quantized discrete cosine transform coefficients is derived.

SUMMARY OF THE INVENTION

It is the main object of this present invention to provide a new JPEG compression mode which utilizes a new quantization table for quantization processing so that division operations can be eliminated. Therefore, the operation time for quantization is reduced a lot and JPEG compression is speeded up.

BRIEF DESCRIPTION OF THE DRAWINGS

FIG. f1 is a block diagram illustrating a flow chart for original image compression wherein the descriptors are derived through conversion, block dividing, and then the compression image codes are then obtained with a disorder encoder and the corresponding encoding table.

FIG. f2 is a block diagram illustrating the flow chart for discrete cosine transform encoder module, wherein the level-shifted block is forward discrete cosine transformed first and quantized to derive a DC component and AC components for being computing bases to obtain descriptors.

FIG. f3 is a diagram illustrating conventional quantization method which divides the matrix composed by discrete cosine transform coefficients by the matrix composed by a quantized table to derive quantized discrete cosine transform coefficients.

FIG. ƒ4 is a novel quantization method according to the preferred embodiment of this present invention which multiplies each element of the matrix composed by the discrete cosine transform coefficients and each of the corresponding elements of the matrix composed by the modified quantization table to derive a matrix and then right-shifting n bits of each element of the matrix to derive the quantized discrete cosine transform coefficients.

DETAILED DESCRIPTION

Figure 3:
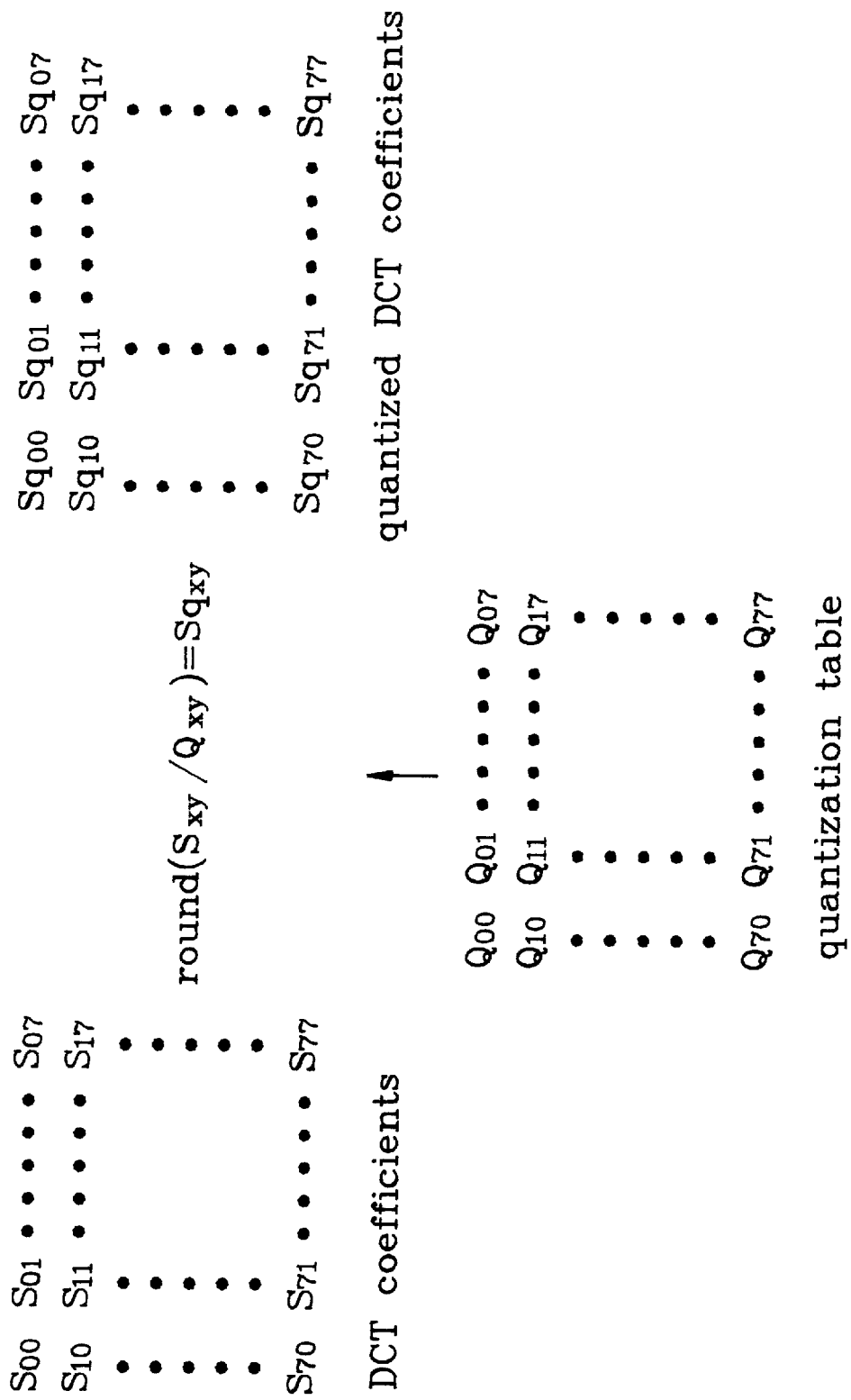
Figure 4:

Referring to FIG. 4, an improved quantization method is illustrated to transform the discrete cosine transform coefficients to quantized discrete cosine transform coefficients. The elememts of the matrix composed by discrete cosine transform coefficients multiplies the corresponding elements of the matrix composed by the modified quantization table to derive a matrix and then right shift n bits of each element of the matrix to derive quantized discrete cosine transform coefficients to accomplish quantization processing.

FIG. 4 is an improved quantization method which converts DCT coefficients to quantized DCT coefficients. The modified quantization table is derived from the inverse of each element in an original quantization table multiplying by $2^n$ and then being rounded to get each element $Q'_{xy}$ of the modified quantization table is obtained. The following is the key issue of this present invention. Through the processing of the original quantization table, a modified quantization table is obtained. During quantization processing, discrete cosine transform coefficient matrix is directly multiplying the modified quantization table. An eight by eight matrix is thus obtained and the elements in a matrix is right-shifted n bits to perform rounding-off processing so that quantized discrete cosine transform coefficients are obtained. Through the modified quantization table, it needs only multiplying function to perform quantization operation. Compared with the original technique, mass division operations are eliminated. Therefore, the operation time for microprocessors is reduced and the complexity for hardware circuits is reduced a lot.

While digital signal processing DSP chip performs quantization, there is no single division operation instruction. In traditional quantization techniques, it takes too much time for some other instructions to sympathize division operation instructions. According to the novel quantization method of this present invention, through n=15 test, the same quantization result is obtained and the performing time is 80% reduced down.

What is claimed is:

1. A method for speeding up JPEG quantization operations in image compression which converts original image data to Y, $C_b$ and CU coefficients through matrix operations, divides blocks each being composed of 64 equal to 8 by 8 sampling points, then performs compression by block, and performs level shift of the values in each block to perform discrete cosine transform and quantization operations, said method comprising the steps of:

(a) obtaining a descriptor for each sampling point of a block respectively through the operations and processing of a discrete cosine transform module;

(b) obtaining a set of codes with a JPEG disorder encoder referring to a Huffman encoding table, said codes are followed with quantized discrete cosine transform coefficients of said sampling points to accomplish encoding, and then after encoding each block the front and the end are respectively affixed with a header and a trailer;

wherein the operations and processing of a discrete cosine transform module in step (a) including the following steps:

(i) converting the level-shifted block value to discrete cosine transform coefficients through forward discrete cosine transform;

(ii) performing quantization processing to multiply the parameters in a modified quantization table with the discrete cosine transform coefficients in a block and then to divide the result by $2^n$, where n is an integer;

(iii) dividing the quantized values in a block to a direct current component and alternate current components, defining the difference between the direct current component of this block and the direct current component of a preceding block as a descriptor of the direct current and defining the alternate current components themselves as corresponding descriptors;

(iv) further wherein the performing quantization processing step utilizes parameters O'xy in said modified quantization table, which is derived from parameters Oxy in an original quantization table be dividing Oxy with $2^n$ and then rounding off.

2. The method for speeding up JPEG quantization operations in image compression according to claim 1, wherein n is an integer greater than 14.

3. The method for speeding up JPEG quantization operations in image compression according to claim 1, which further comprises the step of optimizing the value of n for a predetermined quantization table.

* * * * *